Oct. 21, 1958     D. C. MINTEER     2,857,506
ARTIFICIAL ILLUMINATED TREE
Filed April 28, 1954
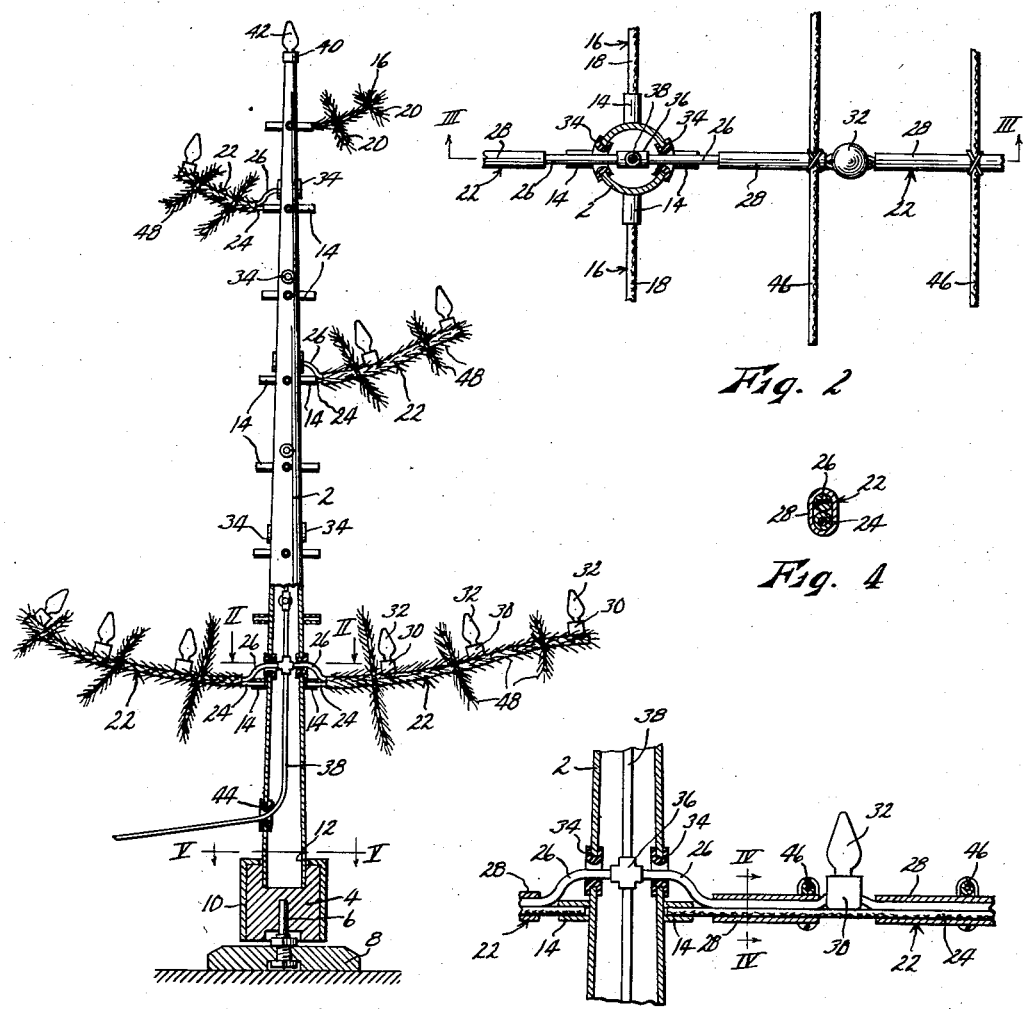
INVENTOR,
Dorothy C. Minteer
BY
Hamilton & Hamilton
Attorneys.

United States Patent Office 2,857,506
Patented Oct. 21, 1958

2,857,506

ARTIFICIAL ILLUMINATED TREE

Dorothy C. Minteer, Springfield, Ill.

Application April 28, 1954, Serial No. 426,154

1 Claim. (Cl. 240—10)

This invention relates to new and useful improvements in artificial trees, and has particular reference to electrically lighted trees such as Christmas trees.

The principal object of the present invention is the provision of an artificial tree decorated with electric light bulbs, in such a way as to avoid the unsightly appearance and possible danger of electric wires trained loosely over the tree branches to the bulbs, said electric wires being incorporated in and forming a part of the branches of the tree.

Another object is the provision of an artificial tree of the character described wherein the tree branches may be folded against the trunk in a compact bundle, for convenience of storage and shipment.

Other objects are simplicity and economy of structure, ease and convenience of use, compactness, and adaptability for use in other decorative devices than artificial trees.

With these objects in view, as well as other objects which will appear in the course of the specification, reference will be had to the drawing, wherein:

Fig. 1 is a side elevational view of an artificial tree embodying the present invention, partially broken away and with most of the branches thereof removed for purposes of clarity.

Fig. 2 is an enlarged fragmentary sectional view taken in line II—II of Fig. 1, with the artificial foliage removed from the branches.

Fig. 3 is a fragmentary sectional view taken on line III—III of Fig. 2.

Fig. 4 is an enlarged sectional view taken on line IV—IV of Fig. 3.

Fig. 5 is a sectional view taken on line V—V of Fig. 1.

Like reference numerals apply to similar parts throughout the several views, and the numeral 2 applies to a hollow, tubular trunk member which may be formed of metal, wood, plastic or other suitable material and which is preferably tapered in diameter. The lower end thereof is fixed in any suitable manner in a substantially cubical block 4. Said block is mounted rotatably on a vertical spindle 6 fixed in a circular, floor-engaging base 8. The entire trunk, and of course the branches carried by the trunk, can thus be turned about a vertical axis in order to display the tree to the best advantage. Also, block 4 is provided with a cover 10 of a heavy material such as lead, said cover being substantially rectilinear in form, fitting snugly over the block and having an aperture 12 through which trunk 2 passes. The cover of course gives the tree a greater degree of stability, and permits the use of a base of smaller diameter than would otherwise be practical.

A plurality of socket members 14 are fixed to trunk 2 at vertically spaced apart points therealong. Said sockets may be short lengths of pipe or tubing, welded or otherwise permanently fixed to the trunk at their inner ends. Each of said sockets carries a branch of the tree. Certain of said branches, designated by the numeral 16, each comprises a length 18 of relatively stiff, but bendable and non-resilient material, the inner end portion of which is cemented or otherwise permanently secured in one of sockets 14. Cross-branches 20, also comprising strands of bendable, non-resilient material, may be wired or otherwise secured to strands 18. Certain other branches, designated by the numeral 22, each comprise a strand 24 of bendable, non-resilient material similar to members 18 and secured in one of sockets 14, a pliable, double-conductor electric cable 26 laid along strand 24, and a pliable tubular sheath 28 of electrical insulating material enclosing strand 24 and cable 26. This sheath may suitably be rubber, plastic, or the like.

Sheath 28 is interrupted at various points along its length, thereby exposing portions of cable 26. To these exposed portions are attached electric light bulb sockets 30, each of which carries an electric light bulb 32. The inner end portion of cable 26 passes into trunk 2 through a hole formed in said trunk adjacent the corresponding socket 14, and protected by an insulating eyelet 34. Within trunk 2, each cable 26 is connected by a suitable electric fitting 36 to an electric cable 38 passing longitudinally through the trunk. Said last named cable is also connected to a socket 40 disposed at the top end of the trunk and provided with a bulb 42. Adjacent the lower end of the trunk cable 38 emerges from said trunk through an insulating eyelet 44, and is adapted to be connected with a suitable source of electric power. The full details of the electrical connections are not shown, it being understood that all of the electric bulbs are connected electrically, preferably in parallel, in such a manner that they are supplied with an operating electric current whenever cable 38 is connected to a source of current.

Each of branches 22 is also provided with cross-branches 46 formed of strands of bendable, non-resilient material wired or otherwise secured to sheath 28, as best shown in Figs. 2 and 3. All of the branches 16 and 22, and their cross-branches, are covered with an artificial foliage 48 as indicated in Fig. 1. This foliage may be, for example, shredded paper or fiber cemented to the branches, or fringed paper tape wrapped about the branches, or the like. The foliage may of course be of any desired color, and is preferably fire-proofed for purposes of safety.

Thus it is apparent that an artificial tree having several advantages has been produced. The branches may be folded neatly against the trunk to form a compact bundle, thereby providing for ease and convenience of storage and transportation without necessity of assembly or disassembly of parts. The use of the weighted cover 10 on the block 4 permits the use of a smaller base. The tree branches may be bent and formed to give the tree any desired shape. Unsightly electrical wiring is virtually completely concealed. The pliability of the electric cables 26, and the short, unrestrained portions of said cables immediately adjacent the trunk, permit repeated bending and flexing of the branches without danger of breaking the electrical conductors or damaging the insulation. The positioning of each light socket 30 against the stiff wire strand 24, and the fact that cable 26 is secured to wire strand 24 immediately adjacent the sockets, by means of sheath 28, provides that the light sockets will be properly supported in an upright position despite the pliability of cables 26.

While I have shown and described a specific embodiment of my invention, it is readily apparent that many minor changes of structure and operation could be made without departing from the spirit of the invention as defined by the scope of the appended claim.

What I claim is new and desire to protect by Letters Patent is:

An artificial tree comprising a trunk member and a plurality of branches secured to said trunk, each of said branches comprising a strand of bendable, non-resilient material secured at one end to said trunk, a pliable electric cable disposed along said strand, a pliable tubular sheath encasing said strand and said cable, whereby said cable is secured to said strand along substantially the length thereof, said sheath being divided into sections which are spaced apart to expose portions of said strand and cable, electric light bulb sockets mounted operatively on the portions of the cable thus exposed, said pliable cable being supported immediately adjacent said sockets by said strand and sheath, and an electric light bulb mounted in each of said sockets.

References Cited in the file of this patent

UNITED STATES PATENTS

| | | |
|---|---|---|
| 742,871 | Hummel | Nov. 3, 1903 |
| 1,594,414 | Glover | Aug. 3, 1926 |
| 1,677,972 | Marks | July 24, 1928 |
| 1,913,921 | Eastwood | June 13, 1933 |
| 1,916,750 | Black | July 4, 1933 |
| 1,974,735 | Botham | Sept. 25, 1934 |
| 2,110,353 | Barkes | Mar. 8, 1938 |
| 2,708,324 | Wedden | May 17, 1955 |